June 24, 1947.  J. WILLIS  2,422,870
COMBINATION SHEATH AND REEL FOR LEADERS
Filed Aug. 17, 1943
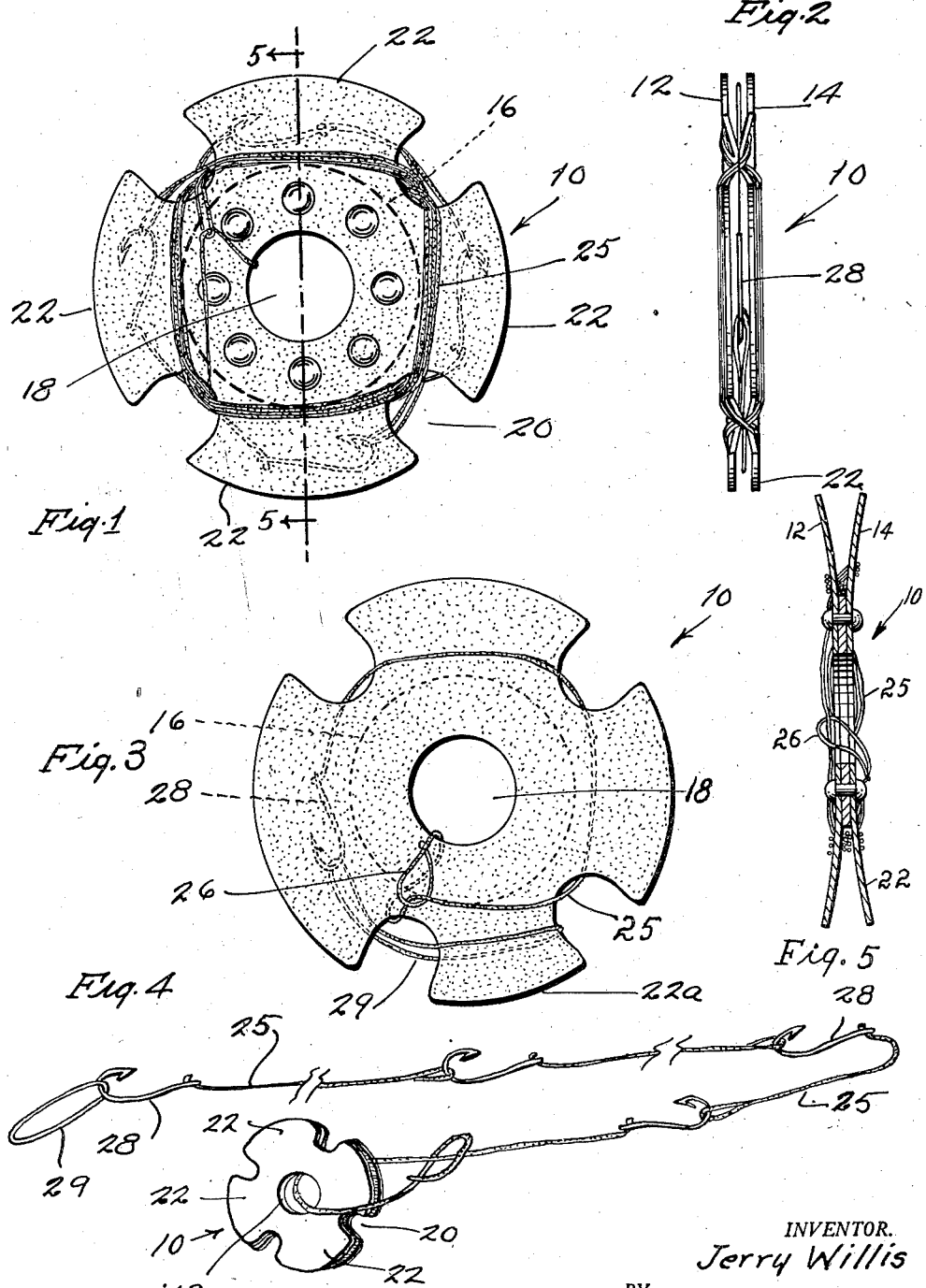
INVENTOR.
Jerry Willis
BY Robt. S. Woolsey
his Attorney Patented June 24, 1947

2,422,870

UNITED STATES PATENT OFFICE 2,422,870

COMBINATION SHEATH AND REEL FOR LEADERS

Jerry Willis, Santa Ana, Calif.

Application August 17, 1943, Serial No. 498,990

2 Claims. (Cl. 43—31)

Sport angling involves the use of numerous line leaders usually formed of gut, one end of which is secured to a hook while the other of the ends thereof is adapted to be attached to a cord. Those familiar with leaders are well aware of the difficulty usually met in handling leaders, for they readily become ensnarled in such a manner as to be extremely difficult to handle. Also, unless the hook is protected in some manner the barb will invariably bury itself in some article of wearing apparel and hence also add to the difficulty of the angler and usually at a time when a change or other replacement of a leader is most pressing.

Your petitioner is well aware of the foregoing and other difficulties which beset an angler who has no methodical arrangement for protection of leaders and conceived the present invention to facilitate handling fishing line leaders, and in view thereof the following may be stated as being among the objects of the present invention.

To provide a combination sheath and reel in which leaders may be carried in end to end serial connection and in which the hook including the barb thereon is retained between the sides thereof.

To provide a combination sheath and reel adapted to be carried in the pocket of the angler and which sheath and reel is provided with a series of recesses, each of which forms the beginning or end of a compartment in which the hook of a leader may repose and which also form or define extensions from the body of the device among and about which the leader may be wound.

To provide a sheath and reel formed of two closely arranged panels so formed and arranged as to provide means upon which leaders may be wound and between which the hooks thereof may be safe-guarded.

To provide a simple, compact, and low cost sheath and reel for leaders, the same being preferably formed of leather or of a phenolic or other suitable plastic material substantially as set forth in the following detailed description.

Other objects, features and advantages of the invention may appear in the accompanying drawing, the description, and sub-joined claims.

In the drawing of which there is one sheet:

Figure 1 is a side-elevational view of the sheath and reel of this invention, illustrating the manner in which a plural number of leaders are joined in end to end relation, the gut being wound over and around projections extending from a portion of the device while the hooks thereof are nested between the inner sides of the projections.

Figure 2 is an end view thereof.

Figure 3 is a side-elevational view of a modification of the device of this invention. The figure shows a single leader in place and the drawing is illustrative of a sheath and reel formed of plastic material.

Figure 4 is a schematic view of the article of this invention, illustrative of a series of leaders joined in end to end relationship. It also shows a rubber band or similar device used to form the ultimate terminal for attachment to the device, while the loop used to make the initial connection to the device is also shown.

Fig. 5 is a mid-sectional elevational view taken on line 5—5, in Figure 1, showing a detail of construction.

As shown in several of the figures of the drawing, the device 10 of this invention constitutes a sheath and reel in combination and is preferably formed of two matched, semi-flexible disc like pieces of leather or of plastic material. The elements 12 and 14 which constitute the sides of the device are held in fixed relationship by means of rivets as shown in Figure 1 or a suitable adhesive may be used to join the sides 12 and 14 of the modified form of the invention shown in Figure 3. A spacer 16 having an opening therein and in matched alignment with the opening 18 formed in the discs 12 and 14 may be inserted between the discs to slightly space them apart if it is desired to increase the capacity of the sheath and reel, although generally speaking ample leader capacity is provided without the addition of such inserts, which if used will of course widen the groove or annular trough existing between the sides 12 and 14.

A plural number of recesses 20 are formed in the outer edges of the discs 12 and 14, thus forming in reality a plural number of lugs or ears 22 extending radially from the center of the device. The lugs or ears 22 may be equally spaced around the periphery of the sheath-disc, but I find it preferable to vary the distance as shown in Figure 3 between the recesses so that accommodation may be provided leaders of any given length or of variable length, for it may be that after a leader has been wound upon a sheath, a short end thereof remains to be wound in place. In this case, a wrap or so around the base of one of the smaller lugs will shorten the remainder of the leader in such degree that the hook 28 will lie between the ears or lugs 22 whereby the hook is protected from entanglement with clothing and/or other articles.

A rubber band or loop 29, as shown in Figure 3, is adapted to encircle one of the lugs or ears 22a for the purpose of holding a hook 28 under yieldable tension between a pair of the aforementioned lugs or ears.

The foregoing matter is descriptive of the physical features involved in the articles of this invention, a description of use will now be set forth to facilitate a better understanding thereof.

The loop 26 of the leader 25 is inserted through the opening 18 and then the hook 28 and the remainder of the leader are inserted through the loop 26 as shown in Figure 3, and thereafter the remainder of the leader is wound alternately around the ears 22, that is, it is passed first around one side of an ear or lug 22 and is then passed around the other side of the next successive ear or lug 22 until the length thereof has been wound in place upon the sheath-disc.

After a substantial amount of the leader has been wound in place and only a relative short length having the hook remains, it may happen that the hook will lie between one of the pairs of ears as shown in Figure 3, however, if the leader should be of such length as to cause the hook to lie across one of the openings 20, then in that event it is only necessary to wind the leader around one of the smaller of the lugs or ears until the remaining leader length is such as to cause the hook to lie between the sides of a matched pair of the lugs 22 as shown in dotted lines in Figure 3 of the drawing.

A rubber band 29 may then be looped over the hook 28 and a selected lug, such as lug 22a thus firmly enough holding the hook in protected position.

A great number of leaders may thus be accommodated and orderly maintained and protected by the use of the device of this invention which by reason of its simplicity enables an angler to quickly wind a leader thereon or remove it for use upon his line as occasion may require.

The drawing and the foregoing description are illustrative of my preferred forms of construction only and in a review and interpretation thereof are to be only so considered, it being specifically understood that I reserve to myself all equivalency of construction and function which falls within the reasonable scope of the invention.

I claim:

1. In combination, a sheath for the orderly arrangement and protection of leaders and hooks attached thereto for fishing lines, said sheath comprising a pair of matched semi-flexible discs, said discs being fixedly secured together and having an opening extending through the center thereof, said discs being provided with unequally spaced recesses in the periphery thereof whereby tab-like extensions of unequal length are created extending radially from a portion of the sheath, the relationship between said opening and any one of said recesses being such as to provide an anchorage for a first leader looped to pass through said opening and through a recess, said tab-like extensions being adapted to receive said leader or leaders wound thereon in such manner as to cause a hook on said leader to nest between one of the pairs of tab-like extensions, and flexible means looped over a last remaining hook and over another one of the tab-like extensions whereby the last said hook is held in nested position between a pair of said extensions.

2. In combination, a sheath for the orderly arrangement and protection of hooks and leaders for fishing lines, said sheath comprising a pair of semi-flexible discs having a centrally positioned opening extending therethrough, said discs being provided with unequally spaced recesses in the periphery thereof whereby tab-like extensions of unequal length are created extending radially from a portion of the sheath, the relationship between said opening and any one of said recesses being such as to provide an anchorage for a first leader looped to pass through said opening and through a recess, said tab-like extensions being adapted to receive said leader or leaders wound thereon in such manner as to cause a hook on said leader to rest against one of the faces of one of said tab-like extensions whereby the hook is afforded a degree of protection, and flexible means looped over the hook and over another one of the tab-like extensions whereby the last said hook is held in face contact with a tab-like extension.

JERRY WILLIS.

REFERENCES CITED

The following references are of record in the file of this patent:

UNITED STATES PATENTS

| Number | Name | Date |
|---|---|---|
| 413,192 | Latulip | Oct. 22, 1889 |
| 1,850,039 | Townsend | Mar. 15, 1932 |
| 595,998 | Garland | Dec. 21, 1897 |
| 2,137,618 | Krimmel | Nov. 22, 1938 |
| 1,256,278 | Takeuchi | Feb. 12, 1918 |
| 2,250,281 | Sundstrand | July 22, 1941 |

FOREIGN PATENTS

| Number | Country | Date |
|---|---|---|
| 16,185 | Great Britain | Sept. 23, 1891 |
| 22,650 | Great Britain | Oct. 13, 1906 |
| 222,296 | Great Britain | Oct. 2, 1924 |
| 433,952 | Great Britain | Aug. 23, 1935 |
| 497,365 | Great Britain | Dec. 19, 1938 |
| 22,131 | Great Britain | Nov. 6, 1899 |
| 433,952 | Great Britain | Aug. 23, 1935 |